Figure 1:
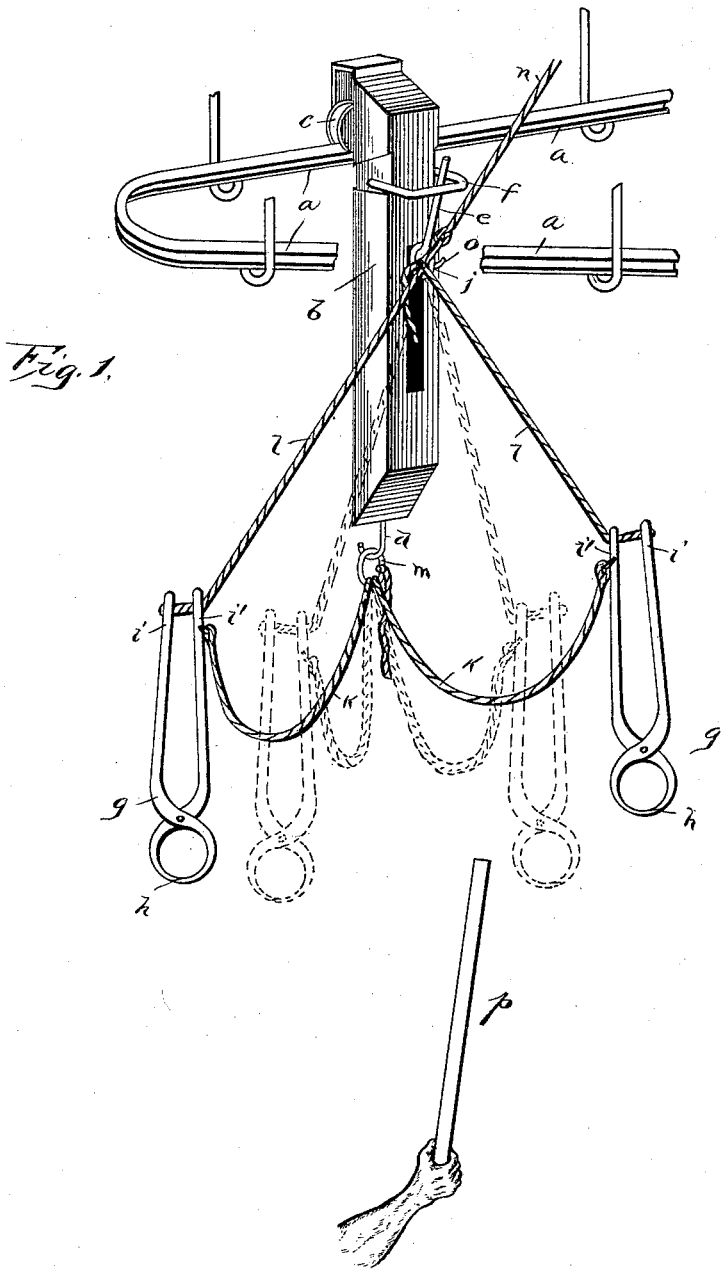

(No Model.) 2 Sheets—Sheet 1.

J. L. HUMASTON.
SUSPENDING APPARATUS FOR SLAUGHTERING.

No. 431,358. Patented July 1, 1890.

Witnesses:  
Inventor:  
J. L. Humaston  
By his Attorney (No Model.) 2 Sheets—Sheet 2.
J. L. HUMASTON.
SUSPENDING APPARATUS FOR SLAUGHTERING.
No. 431,358. Patented July 1, 1890.
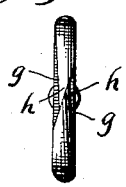
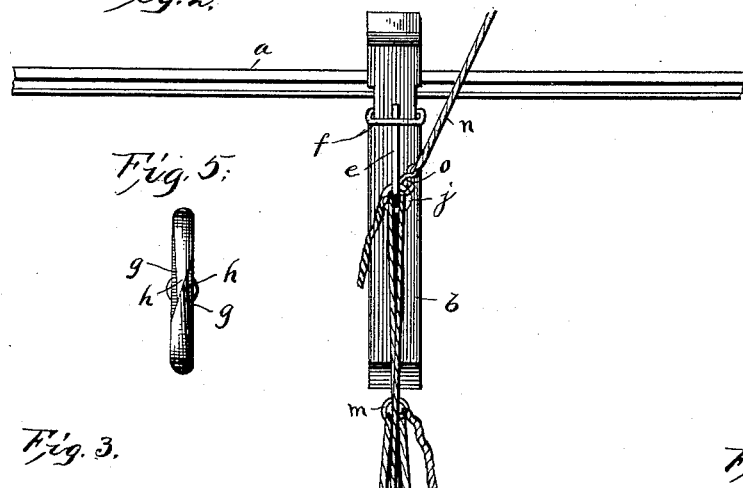
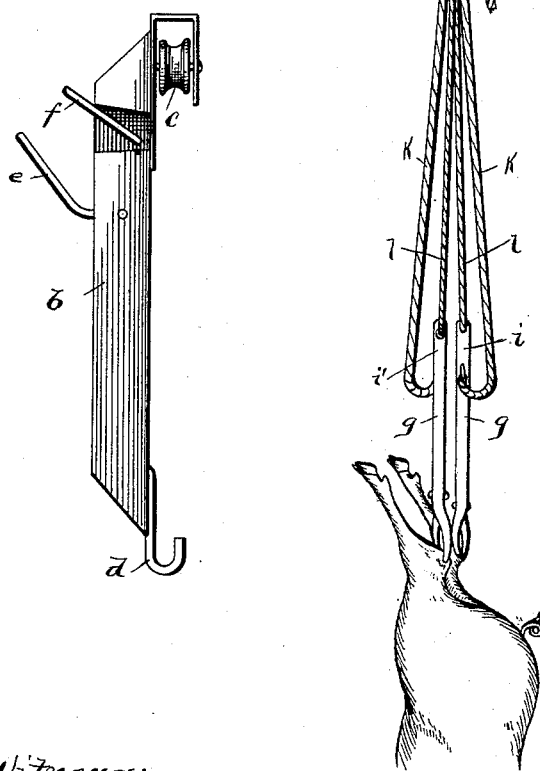
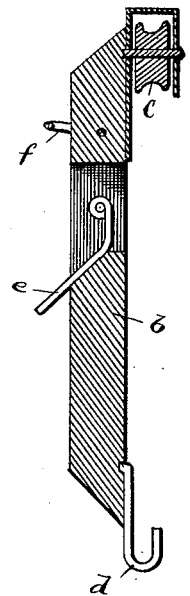
Witnesses: Inventor:

UNITED STATES PATENT OFFICE.

JOHN L. HUMASTON, OF TERRE HAUTE, INDIANA.

SUSPENDING APPARATUS FOR SLAUGHTERING.

SPECIFICATION forming part of Letters Patent No. 431,358, dated July 1, 1890.

Application filed May 2, 1890. Serial No. 350,293. (No model.)

*To all whom it may concern:*

Be it known that I, JOHN L. HUMASTON, of Terre Haute, in the county of Vigo and State of Indiana, have invented certain new and useful Improvements in Suspending Apparatus for Slaughtering; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in slaughtering apparatus, and more particularly to certain improvements in apparatus for elevating and conveying hogs.

The present apparatus is intended to raise and convey hogs from the stock-pen and automatically deliver them into the scalding-trough.

Heretofore an attendant has been located in the stock-pen and another attendant at the entrance to the scalding-trough to release the clutch or grapple and drop the animal into the pen. The attendant in the pen is provided with a single grapple. With this he catches an animal by one of his hind legs at the tender and fleshy portion of the leg above the "hock." The grapple is then hoisted, lifting the hog by the single hind leg to the elevated track, upon which the grapple is carried to the scalding-trough. By reason of the struggles and violent exertions of the hog while being raised by one leg the blood-vessels of the leg are bruised and ruptured when held by the grapple, the knuckle or joint is twisted and wrenched out of place, and the bones at the hip or upper joint are bruised and ruptured, whereby the blood settles in the flesh at the joints and in the marrow of the bones, so that when the animal is bled this blood does not flow out; hence when the hog is cut up and the ham cured this blood still remains in the ham, thereby spoiling it in a short time, for blood cannot be cured and meat cannot be preserved until all blood is removed therefrom. This is a well-known fact.

The object of this invention is to provide an improved apparatus for the above purpose which will avoid the disadvantages mentioned, and which will grasp and hold the hog suspended by both hind legs, whereby the hog cannot so throw and twist himself as to dislocate his leg-joints or otherwise injure himself, thereby avoiding the rupture of blood-vessels, and also to so grasp the legs of the animal as to prevent rupture and twisting; and a further object is to provide an improved arrangement for releasing and dropping the same into the scalding-trough.

These objects are accomplished by and this invention consists in certain novel features of construction and in combinations of parts more fully described hereinafter, and particularly pointed out in the claims.

Referring to the accompanying drawings, Figure 1 is a perspective showing a portion of the elevated track and the lifting and conveying apparatus, the grapples being located apart out of their normal positions, so that all parts will show, a stick by which the grapples can be opened also being shown in this view. Fig. 2 is an elevation showing a portion of a suspended hog. Figs. 3 and 4 are respectively a side elevation and section of the conveying car or hanger traveling on said elevated track. Fig. 5 is a detail view of one of the grapples.

In the drawings the reference-letter $a$ indicates the usual inclined elevated track, which can be suitably arranged anywhere in the building to extend from a point over the stock-pen to the entrance into the scalding-trough and back again, so that the depending car or hanger $b$, provided with roller $c$, traveling on said track, can readily run down the inclined track from the stock-pen end of the same to the entrance to the scalding-trough, where the hog is dropped, and then run back again and be lifted from the lower end of the track and placed upon the higher end over the stock-pen. This hanger consists of a strong block $b$, at its upper end having the sheave carrying the roller $c$ to run on the track and support the hanger. In its lower end the hanger is provided with the strong metal hook $d$. A strong metal swinging holding and releasing finger $e$ is longitudinally located on the outer side of the upper portion of the block $b$, with its lower end bent and extending into a transverse slot in the block, where said end is pivoted to allow the free straight end of the finger to swing vertically from the holding position of Fig. 2 to those of Figs. 3 and 4. The finger is detachably held in holding position by the vertically-swinging U-shaped yoke *f*, at its ends pivoted in slots or grooves on opposite sides of the upper portion of blocks *b*, so that said yoke when in its normal position, will pass around the upper end of the finger *e* and hold the same raised, as shown in Fig. 2; hence if said yoke is swung up it will release the finger and the same will drop to the position shown in Fig. 4 and release anything supported by it.

The device for catching and holding the hog consists of the two similar grips or clutches *g g*, each consisting of the two lever members fulcrumed together between their ends, with the ends of the members on one side of the fulcrum bent outwardly in opposite directions and their free ends bent inwardly to form the circular opening to tightly receive the leg of the hog below the hock. The extremities *h* of the two clamping ends of the grips are sharpened and overlap, as shown and for the purpose hereinafter mentioned. The opposite ends of the members are extended to form the lever-handles *i i'*, by which the grips are operated and held closed. A rope, chain, or other flexible and strong connection *l* at its opposite ends is rigidly secured, respectively, to the upper ends of a corresponding handle *i* of each grip, and passes loosely through eyes or openings in the upper end of the other handle *i'* of each grip, as clearly shown in Fig. 1, so that a pull on the center of said rope will tend to draw together the two handles of each grip, and thereby hold the clamping ends of the two grips tightly closed. At its center this rope is provided with a strong metal ring *j*. A strong rope or other flexible connection *k* at its opposite ends is rigidly secured, respectively, to the upper portion of handle *i'* of each grip, through which the connection *l* loosely passes. At its center this rope is provided with a strong metal ring *m*.

*n* indicates an elevating-rope provided with hook *o* at its lower end. This rope is operated by suitable hoisting means (not shown) to raise a hog and the gripping mechanism from the stock or close pen to the traveling hanger *b* on the track.

The operation of the apparatus is as follows: Two men (preferably) are located in the stock-pen, each having a grip of the grappling mechanism. A hog is caught and the two grips are clasped upon the two hind legs thereof, the sharp points of the grips being passed through the legs at the hock between the bone and the large cord passing down the leg, thereby obviating the necessity of bruising the flesh and consequent settling of the blood, as the flesh is pierced and the blood from all blood-vessels ruptured will flow out through the cut formed by the grips. When the hog is caught by both hind legs, the hook *o* of the elevating-rope is caught in the ring *j* of rope *l* and the hoisting apparatus is set in operation, thereby raising the hog by his hind legs through the medium of the grappling mechanism, the strain on the rope *l*, as before mentioned, holding the two grips tightly closed on the legs of the hog. When the grappling device and hog are raised a sufficient distance, the ring *j* is placed by an attendant on the holding and releasing finger of the hanger at the upper end of the track, which finger is swung up into holding position and caught by its catch or yoke. The ring *m* of rope *k* is then caught on the hook *d*. The hog and gripping device being now suspended from the hanger, the hanger is drawn along the track toward the scalding-trough, before reaching which the suspended hog is "stuck" and bled, and when the hanger is moved a sufficient distance to bring the hog opposite the opening into the scalding-trough an attendant by means of a rod or stick *p* (see Fig. 1) knocks up the catch or yoke *f* from its engagement with the holding-finger, which by reason of the weight of the hog carried thereby immediately falls down and drops the ring it carries, thereby allowing rope *l* to hang loose and throwing all the weight on the rope *k*, thereby pulling the handles of the two grips apart, releasing the grips from the legs of the hog, and dropping the hog into the scalding-trough, the grappling device now hanging loose, the hanger is moved around the lower end of the track and transferred to the upper end and the gripping device again removed and lowered to the men in the pen in readiness to catch another hog.

If desired, the hog may be caught around the legs beneath the hock; but my preferred manner is to catch the hog as shown in Fig. 2. The word "rope" is used in the specification and claims broadly to cover any kind of a strong flexible connection.

The great advantages of this invention are obvious. As soon as the hoisting-rope is hauled taut it instantly brings both legs together and prevents the rupture of the "fan" joint near the rear end of the backbone, and of the knuckle-joint by twisting or wrenching it out of its socket beneath the coupling-bone, and of the blood-vessels around the legs, and thereby preventing the blood from settling and congealing in the flesh and marrow.

It is evident that various changes might be made in the form and arrangement of the various parts described without departing from the spirit and scope of my invention; hence I do not wish to limit myself to the precise construction herein set forth.

Having thus fully described my invention, what I claim as new, and desire to secure by Letters Patent of the United States, is—

1. In combination, the two grips, the rope connecting a lever-handle of each grip to open the grips, each having two lever-handles, the rope connected to the other handles of the grips to hold them closed, and the traveling hanger or carriage, substantially as described.

2. The combination of the two grips, each having two lever-handles, the rope secured to one handle of each grip to open both grips, the rope connected to both handles of each grip to hold the same closed, and the traveling hanger having a hook to receive the opening-rope, and a holding and releasing catch for the closing-rope, as set forth.

3. The combination of the two grips, each having the holding portion and the lever-handles, the rope secured to a corresponding handle of each lever, so as to open both grips when strain is exerted on the rope, the rope secured to corresponding handles and passing loosely through the other handle of each grip to hold both grips closed, and the traveling hanger to hold both ropes, substantially as described.

4. In a slaughtering apparatus, the combination of the two grips, each consisting of two lever members fulcrumed together forming the lever-handles, and the outwardly and oppositely bent clamping portions having the sharp overlapping ends, and the ropes attached to said handles for suspending and opening and closing the grips, substantially as described.

5. In combination, the two grips, the rope connecting the two grips to hold the same closed, the rope connecting a corresponding handle of each grip to open the grips, rings secured to the center of each rope, and the traveling hanger having a rigid hook to receive the ring of the opening-rope and a holding and releasing finger to receive the ring of the closing-rope, substantially as described.

In testimony that I claim the foregoing as my own I affix my signature in presence of two witnesses.

JOHN L. HUMASTON.

Witnesses:
O. E. DUFFY,
C. M. WERLE.